US006785720B1

(12) United States Patent
Seong

(10) Patent No.: US 6,785,720 B1
(45) Date of Patent: Aug. 31, 2004

(54) METHOD FOR CONNECTING TO SERVER DEVICES IN BROWSER-BASED HOME NETWORK APPARATUS THEREFOR

(75) Inventor: Goan-soo Seong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 09/306,410

(22) Filed: May 6, 1999

(30) Foreign Application Priority Data

May 23, 1998 (KR) .............................................. 98-18661

(51) Int. Cl.[7] .............................................. G06F 15/16
(52) U.S. Cl. ..................................... 709/220; 709/253
(58) Field of Search ................................ 709/203, 253, 709/220, 224; 710/63, 313; 345/839

(56) References Cited

U.S. PATENT DOCUMENTS

| 4,423,318 A | * | 12/1983 | Gotou ........................ 235/379 |
| 5,341,371 A | | 8/1994 | Simpson ..................... 370/85.4 |
| 5,535,208 A | | 7/1996 | Kawakami et al. ........... 370/84 |
| 5,535,214 A | | 7/1996 | Shiobara ..................... 370/85 |
| 5,657,221 A | * | 8/1997 | Warman et al. ............... 700/83 |
| 5,689,244 A | | 11/1997 | Iijima et al. ........... 340/825.07 |
| 5,745,109 A | * | 4/1998 | Nakano et al. ............. 345/838 |
| 5,787,259 A | * | 7/1998 | Haroun et al. .............. 709/253 |

(List continued on next page.)

FOREIGN PATENT DOCUMENTS

| EP | 0383768 A2 | 4/1998 | |
| EP | 838768 A2 | * 4/1998 | ........... G06F/17/30 |
| JP | 10-40057 | 2/1998 | |
| JP | 10-124418 | 5/1998 | |
| WO | WO 98/00788 | 1/1998 | |
| WO | 0 838 768 A2 | 4/1998 | |
| WO | 0 835 037 A2 | 8/1998 | |

OTHER PUBLICATIONS

SMASH, "Specification of the interconnection system", Feb. 1998, Delirable #12, www.extra.research.philips.com, pp. 34.*
Wetzel et al., "Consumer Applications of the IEEE 1394 serial bus, and a 1394/DV Video Editing System", 1996, Texas Instruments Inc, IEEE, pp. 12.*
Severance, "Linking Computers and Consumer Electronics", Feb. 1997, Michigan State University, pp. 2.*
"Proposal for Audio and Music Proposal", Aug. 1996, Yamaha Corp., Ver 0.32, pp. 1–49.*
Tom Williams, "Tools and Protocols Link Embedded Systems over the Internet", Aug. 18, 1997, Electronic Design, Penton Publishing, Cleveland, OH, US, vol. 45, No. 17, pp. 91–92, 96, 98.
Institute of Electrical and Electronics Engineers, "IEEE Standard for a High Performance Serial Bus," 1995, IEEE Standard for a High Performance Serial Bus, IEEE STD 1394–1995, New York, NY, IEEE, US, pp. 1–36.

Primary Examiner—Bunjob Jaroenchonwanit
(74) Attorney, Agent, or Firm—Staas & Halsey LLP

(57) ABSTRACT

A method for contacting server devices in a browser-based home network in which the server devices each have a function of a web server and a client device into which a web browser is installed controls the server devices through the web browser. The method includes the steps of preparing a home page of the client device so as to display server device icons for selecting the server devices to be connected to, selecting one of the server devices to be connected to in the home page, reading a register (OPCR) in which an operation state and channel information of the selected server device are recorded from the selected server device, and completing connecting to the selected server device by recording the channel information of the selected server device in a register (IPCR) when the read operation state is active and checking the operation state of the selected server device by reading the register (OPCR) at predetermined time intervals when the read operation state is inactive. As a result, a user can easily and rapidly contact the server devices through a browser in the browser-based home network.

16 Claims, 5 Drawing Sheets

U.S. PATENT DOCUMENTS

| | | | |
|---|---|---|---|
| 5,793,366 A | * 8/1998 | Mano et al. | 345/839 |
| 5,828,899 A | 10/1998 | Richard et al. | 335/828 |
| 5,848,240 A | 12/1998 | Yamamoto | 395/200.43 |
| 5,886,983 A | 3/1999 | Suters et al. | 370/235 |
| 5,889,965 A | * 3/1999 | Wallach et al. | 710/17 |
| 5,898,780 A | * 4/1999 | Liu et al. | 713/155 |
| 5,935,224 A | * 8/1999 | Svancarek et al. | 710/63 |
| 5,978,807 A | * 11/1999 | Mano et al. | 707/10 |
| 5,984,498 A | * 11/1999 | Lem et al. | 700/2 |
| 6,003,097 A | * 12/1999 | Richman et al. | 710/8 |
| 6,009,480 A | * 12/1999 | Pleso | 710/8 |
| 6,012,103 A | * 1/2000 | Sartore et al. | 710/8 |
| 6,032,191 A | * 2/2000 | Chowdhury et al. | 709/238 |
| 6,058,441 A | * 5/2000 | Shu | 710/100 |
| 6,061,746 A | * 5/2000 | Stanley et al. | 710/10 |
| 6,085,265 A | * 7/2000 | Kou | 710/63 |
| 6,100,812 A | * 8/2000 | Tanaka et al. | 340/825.37 |
| 6,101,215 A | * 8/2000 | Takeda et al. | 375/221 |
| 6,131,111 A | * 10/2000 | Yoshino et al. | 709/204 |
| 6,131,119 A | * 10/2000 | Fukui | 709/224 |
| 6,137,949 A | * 10/2000 | Horiguchi et al. | 386/82 |
| 6,160,796 A | * 12/2000 | Zou | 370/257 |
| 6,286,052 B1 | * 9/2001 | McCloghrie et al. | 709/238 |
| 6,288,716 B1 | * 9/2001 | Humpleman et al. | 345/733 |
| 2001/0011284 A1 | * 8/2001 | Humpleman et al. | 707/511 |

* cited by examiner

METHOD FOR CONNECTING TO SERVER DEVICES IN BROWSER-BASED HOME NETWORK APPARATUS THEREFOR

CROSS-REFERENCE TO RELATED APPLICATIONS

This application claims the benefit of Korean Application No. 98-18661, filed May 23, 1998, in the Korean Patent Office, the disclosure of which is incorporated herein by reference.

BACKGROUND OF THE INVENTION

1. Field of the Invention

The present invention relates to a home network, and more particularly, to a method for connecting to server devices through a browser in a browser-based home network, and apparatus therefor.

2. Description of the Related Art

Recently, various digital devices such as a digital television DTV, a digital video cassette recorder DVCR, a DVD player DVDP, and a digital set-top box have appeared.

The IEEE 1394 approved by the IEEE committee is highlighted as the interface for such digital devices. FIG. 1 shows a protocol stack that general IEEE 1394 devices have. A physical layer 100 which is the lowest layer receives a bit stream from a link layer 110 which is an upper layer during transmission and acquires the right to use a serial bus. The physical layer 100 encodes the bit stream, converts the encoded bit stream into an electrical signal, and transmits data to the bus. During reception, the process is reversed. The link layer 110 manages data in units of a packet, integrates and disintegrates a packet, detects errors, and manages a bus cycle. A transaction layer 120 provides a transaction such as read, write, and lock and performs asynchronous communications with other nodes on a 1394 bus using services provided by lower layers.

The link layer 110 has cycle control, packet transmission and packet reception protocols which perform cycle control, packet transmission and packet reception, respectively. The physical layer 100 has encode/decode, arbitration and media interface protocols which perform encoding/decoding, arbitration and media interfacing, respectively. These protocols are specified in the IEEE 1394 standard.

When devices are connected using the IEEE 1394, it is not enough to perform data transmission between devices with only an IEEE 1394 specification. Namely, rules with respect to processes of securing a connection between devices for transmitting and receiving A/V data and an isochronous channel for transmitting the A/V data should be established between devices. For this, an IEC 61883 specification exists.

As noted, the IEC 61883 specification is a standard for specifying connection management of a system connected by a digital interface according to, for example, the IEE 1394 specification. An input plug control register (IPCR) and an output plug control register (OPCR) are specified by the IEC 61833 specification and perform connection management between digital devices.

In the IEC 61883 specification, a function control protocol (FCP) a connection management protocol (CMP) 130 are defined. The CMP defines the structure of software for managing the isochronous connection between devices. The FCP provides a framework for transmitting commands such as an A/V control command and transaction set AV/C CTS. Another characteristic of the IEC 61883 is to define a common isochronous packet CIP header structure. The CIP header has information on a source stream included in the isochronous packet.

A control command is used in order to control the devices in a conventional specification meeting the specification of the IEEE 1394 and the specification of the IEC 61883. The AV/C CTS is a representative control command. Every function of devices is defined by a code of a hexadecimal number system. For example, a play command of the VCR is defined as "0xC8".

In a digitized home device environment, one device may be used as a control center for controlling other devices. However, the following problems occur. Here, the device for controlling other devices is called a controller and the devices to be controlled are called target devices. First, the controller should include all the command sets with respect to the respective target devices, which is a considerable burden on the controller with respect to software and hardware. Second, since the target devices do not know commands other than the commands included when products are brought to market, they cannot be controlled by new client devices. Therefore, it is not possible to easily conform to a digitized home device market which rapidly changes. Third, it is not easy to provide a graphical user interface. It is difficult to define a unified type of GUI which can be applied to all kinds of devices. Also, defining the type of GUI with respect to each group of products has its limitations. Such problems are due to inconsistency of architecture. The problems can be easily solved by selecting a client/server method as in the widely applied TCP/IP architecture.

FIG. 2 shows a protocol stack to which the present invention is applied. Each device operates like a web server on the Internet. At this time, the IEEE 1394 is used as a network interface. A TCP/IP layer is put on the IEEE 1394. Every device operates according to the HTTP protocol. A device which has a display device such as a DTV or a PC includes a web server and operates as a web client. A user accesses the respective home pages from web server devices using a web browser built into the client device, thus controlling corresponding devices.

The MPEG stream box denotes an audio/video data stream compressed by an MPEG algorithm, for example, MPEG-2. The box labelled IEC 61883 is specified in the IEC 61883 specification as a CIP (Common Isochronous Packet) header structure. The CIP header contains information of the source stream included in isochronous packets. Thus, the IEC 61883 denotes a part of the IEC specification when the CIP header structure is specified.

In a protocol stack environment having the structure shown in FIG. 2, a server device which has a web browser accesses a web server device by the browser thereof and controls the server device which operates as the web server. For this, connection to the server device should be made by the web browser. The method for contacting the server devices through a web browser should be convenient to the user. The server devices desired by the user should be distinguished from the server devices which are not desired by the user during the connection. The connection should be performed considering compatibility among the server devices with respect to data formats.

SUMMARY OF THE INVENTION

It is an object of the present invention to provide a method of connecting to server devices by a browser of a browser-based home network, by which a user can easily and rapidly connect with server devices.

Additional objects and advantages of the invention will be set forth in part in the description which follows and, in part, will be obvious from the description, or may be learned by practice of the invention.

Accordingly, to achieve the above and other objects of the present invention, there is provided a method for connecting to server devices in a browser-based home network comprised of server devices including a function of a web server and a client device into which a web browser is installed for controlling the server devices through the web browser, comprising the steps of preparing a home page of the client device so as to display server device icons for selecting the server devices to be connected to, selecting one of the server devices to be connected to in the home page, reading a register OPCR in which an operation state and channel information of the selected server device are recorded from the server device, and completing connecting to the selected server device by recording the channel information of the selected server device in a register IPCR when a read operation state is active and checking the operation state of the server device by reading the register OPCR at predetermined time intervals when the read operation state is inactive.

It is preferable that the step of preparing the home page of the client device includes generating an identification information storing unit of the server devices to be connected to, and the method further includes checking whether the selected server device is registered in the identification information storing unit, wherein the step of reading a register OPCR includes reading the register OPCR only when the selected server device is registered in the identification information storing unit and not connecting to the server device when the selected server device is not registered in the identification information storing unit.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 3:
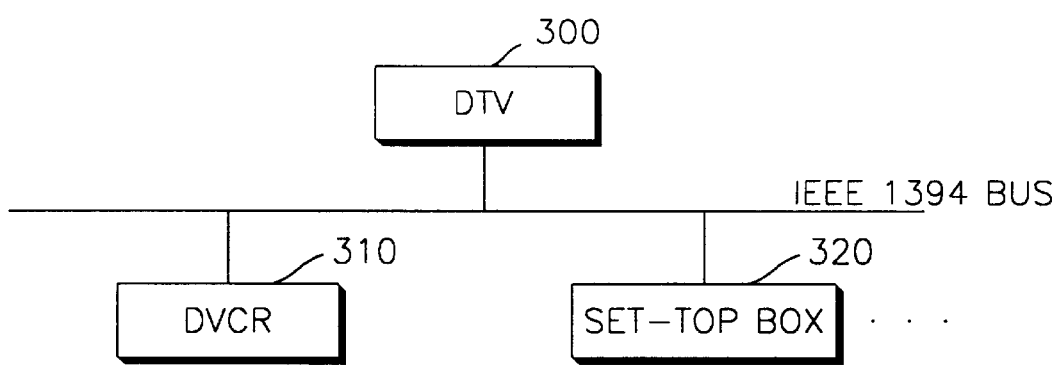
FIG. 3 shows an example of a home network using an IEEE 1394 bus according to an embodiment of the present invention.

Hereinafter, an embodiment of the present invention will be described in detail with reference to the attached drawings. FIG. 3 shows a home network according to an embodiment of the present invention. A digital TV (DTV) 300, a DVCR 310, and a set-top box 320 are connected to each other through an IEEE 1394 bus, thus forming a home network system.

Figure 1:
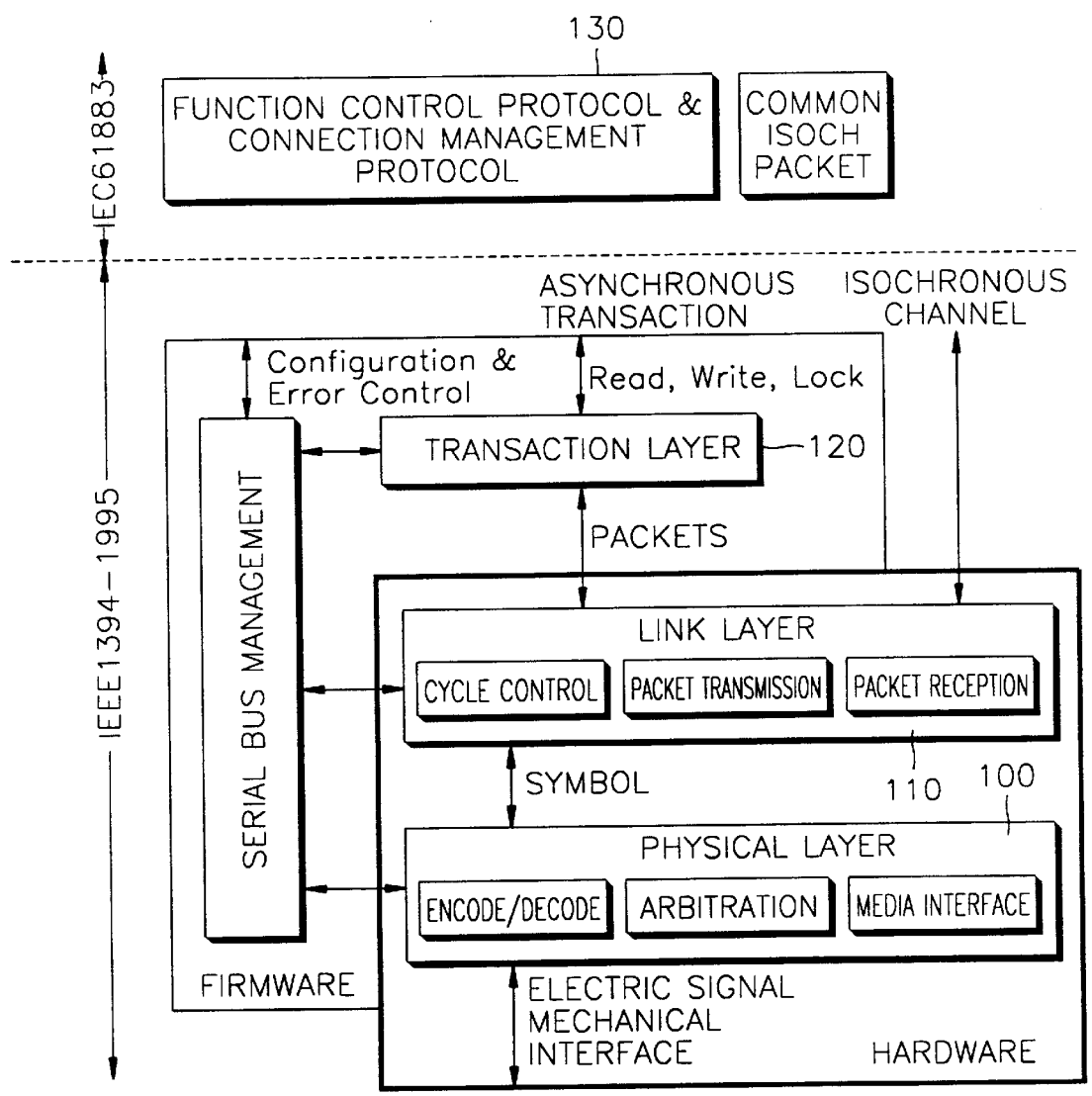
FIG. 1 shows a protocol stack that general IEEE 1394 devices have.
Figure 2:
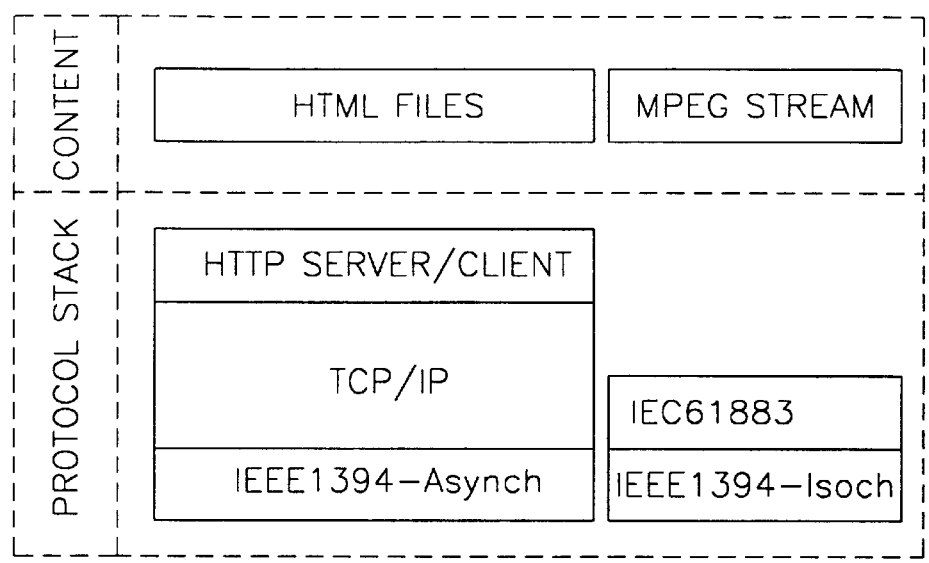
FIG. 2 shows a protocol stack to which the present invention is applied.

The home network system has a protocol stack of the structure shown in FIG. 2. The DTV 300 is a client device into which a web browser is loaded. Any digital device including a display device, into which a web browser is loaded, such as a personal computer (PC) can be used as the DTV 300. The DVCR 310 and the set-top box 320 into which web servers are loaded are server devices. A user can control the server devices by accessing web pages provided by the web servers loaded into the server devices such as the DVCR 310 and the set-top box 320 using the web browser loaded into the client device such as the DTV.

Figure 4:
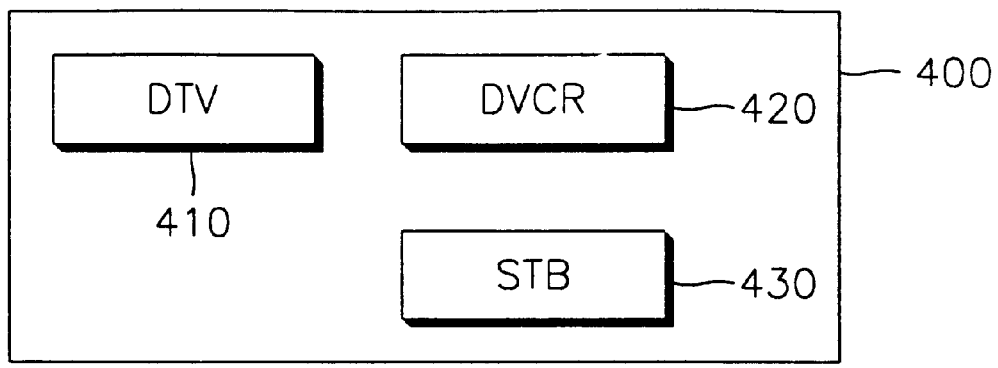
FIG. 4 shows an example of a structure of a home page of a DTV shown in FIG. 3 which has a web browser in a browser-based home network according to the embodiment of the present invention.

FIG. 4 shows an example of the architecture of the home page of the DTV 300 having a web browser in the browser-based home network according to the embodiment of the present invention. A DTV 410, a DVCR 420, and a set-top box (STB) 430 are displayed as icons on a web browser window 400. The above architecture of the screen is only an example and can vary.

Figure 5:
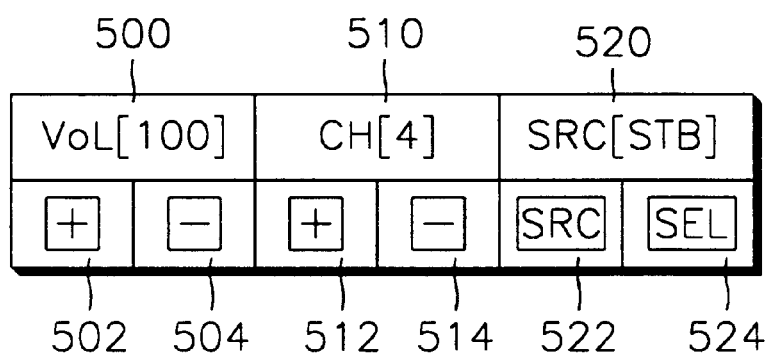
FIG. 5 shows an example of displayed information with respect to the DTV when the DTV icon is clicked in the home page shown in FIG. 4.

When the DTV icon 410 is clicked in the home page shown in FIG. 4, information on the DTV is displayed, an example of which is shown in FIG. 5. The volume level 500, channel information 510, and source information 520 are displayed. 'Vol[100]' indicates that the volume level is set to 100. The volume can be increased by pressing the '+' button 502 and decreased by pressing the '−' button 504. 'CH[4]' indicates that the current channel is 4. The '+' button 512 is pressed to change the channel to a higher channel. The button 514 is pressed to change the channel to a lower channel. Also, 'SRC[STB]' shows the server device which currently is providing data. Here, it means that the server device is the set-top box. 'SRC' 522 is a button for selecting the server device to be displayed. The server device is changed by pressing the SRC button 522. For example, SRC[DVCR] is displayed in the source device 520 by pressing the SRC button 522 once more. The SEL button 524 is a button for confirming that the Vol[100], the CH[4], and the SRC[STB] are set as the user wishes. When the SEL button 524 is pressed, the above setting is performed and is displayed. Namely, under the conditions shown in FIG. 5, connection to the set-top box is performed. The loudness of the volume becomes 100. The channel number 4 of the set-top box is displayed. The architecture of the screen shown in FIG. 5 and the information on the STB when the STB 430 is clicked can be added and changed. The displayed menu screen can be clicked using a mouse or by a touch screen. A user interface with respect to this can be changed.

Figure 6:
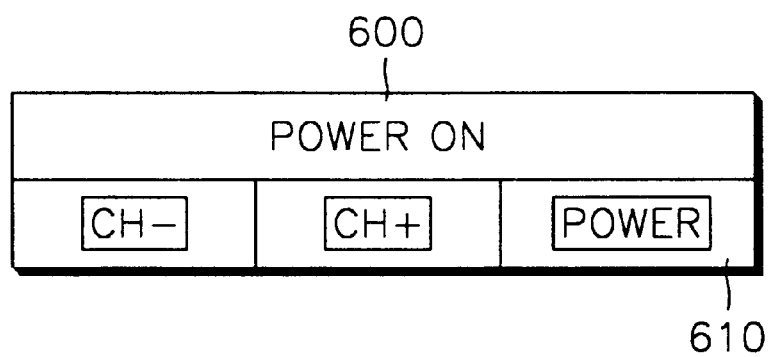
FIG. 6 shows an example in which menus for turning on and off the power of a settop box are displayed.
Figure 7:
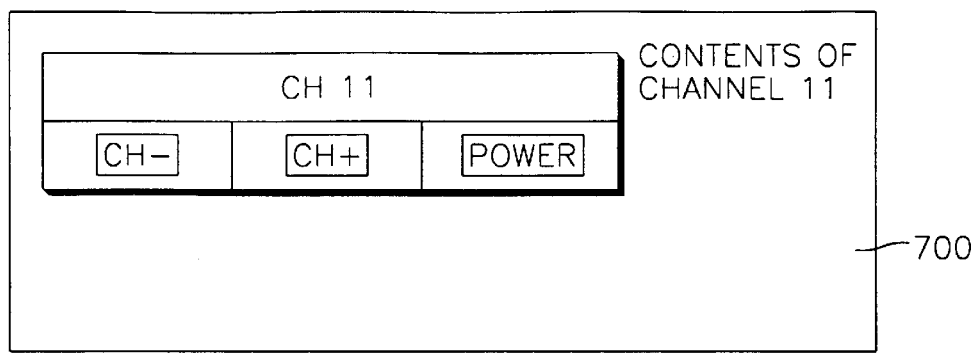
FIG. 7 is an example of a screen displayed when power is turned on by pressing a power button in the screen shown in FIG. 6.

In FIG. 5, when the SEL button 524 is pressed after setting the volume 500, the channel 510, and the source device 520 as the user wishes, the contents of channel 4 of the STB may not be displayed. This happens when data on channel 4 of the STB does not exist on the IEEE 1394 bus. Namely, it means that data is not output from the set-top box 320 which is the server device. In this case, the STB icon is clicked by accessing the home page of the DTV 300 shown in FIG. 4. Then, a menu for turning on and off the power of the settop box is displayed, an example of which is shown in FIG. 6. A power button 610 serves as a toggle switch. Namely, a power screen 600 is displayed in a way in which 'POWER ON' alternates with 'POWER OFF'. When the screen shown in FIG. 6 is in the POWER ON state by pressing the POWER button 610, contents 700 corresponding to the currently set channel (here, CH 11) are displayed as shown in FIG. 7.

An example of a method for connecting to the server device through the web browser in the browser-based home network has been described so far. The contents of the channel set by the STB are displayed by changing the SRC into the STB in the home page on the DTV and pressing the SEL button 524.

Figure 8:
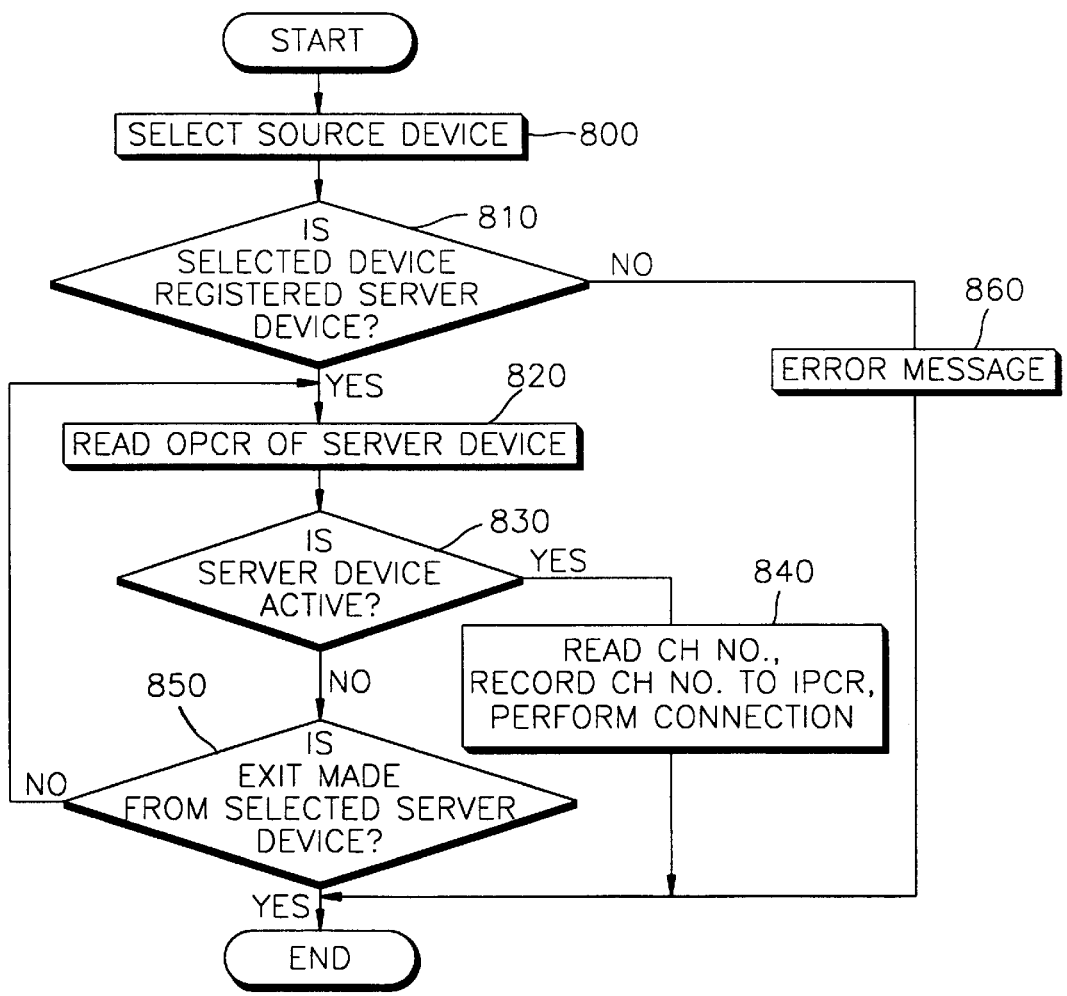
FIG. 8 is a flowchart for describing a method for connecting to server devices without pressing a SEL button.

Hereinafter, a more preferable method of connecting to the server devices through the browser without pressing the SEL button 524 in the browser based home network will be described. FIG. 8 is a flowchart describing a method of connecting to the server devices without pressing the SEL button 524.

Figure 9:
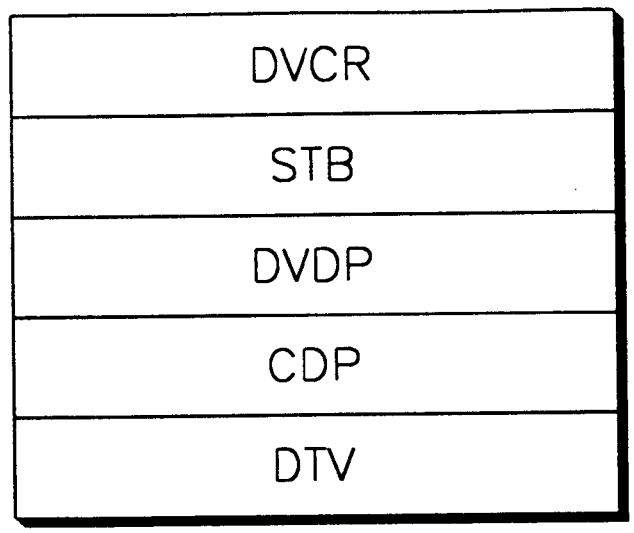
FIG. 9 shows an example of an identification information storing unit.

First, the client device in which the web browser is installed, i.e., the DTV 300 shown in FIG. 3, should include an identification information storing unit for storing the identification information of the server devices for identifying the server devices to be connected to. FIG. 9 shows an example of the identification information storing unit. The identification information storing unit may store the ID information of the server device. The identification information storing unit is for limiting the device a user wishes to connect to when various servers exist and for connecting to only compatible server devices, considering the compatibility of the server devices.

Figure 10:
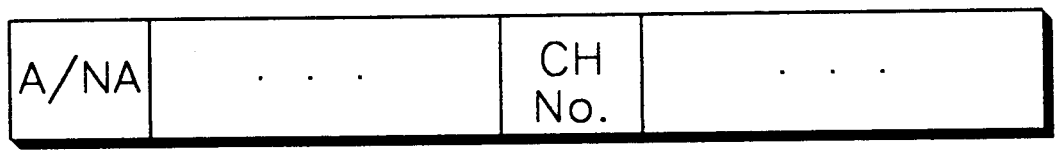
FIG. 10 shows an example of an output plug control register OPCR.

Therefore, a user prepares an identification information storing unit on which the server device which the user wishes to connect to is registered in the web browser of the DTV 300. The web browser of the DTV 300 displays the icon of the server device. In this state, an icon corresponding to the server device to be connected to is selected (step 800). Then, it is checked whether the server device of the selected icon is registered in the identification information storing unit (step 810). According to the IEEE 1394 standard, each device has its own unique ID information, for example, GUI (globally unique identification) information contained in a ROM inside the device. In this step, the ID information of the selected server device is compared with a predetermined look-up table in the identification information storing unit. When the server device is not registered in the identification information storing unit, the process is terminated and an error message appears on the screen of the DTV 300 (step 860). When the server device to be connected to is registered, the output plug control register OPCR of the server device is read from the web browser (step 820). The OPCR is a register located in the server device for storing information related to data output to the IEEE 1394 bus of the server device. FIG. 10 shows an example of the OPCR. The OPCR includes information (A/NA) showing whether the server device outputs data to the IEEE 1394 bus and a channel number (CH No.) when the server device outputs data to the IEEE 1394 bus. If it is noted from the information A/NA on the state of the server device that the state of the server device is active by reading the OPCR of the server device (step 830), the channel number (CH No.) of the server device is read out, the CH No. is recorded in the input plug control register IPCR, and the connection to the server device is performed (step 840). When the state of the server device is inactive, it is checked whether the selection of the server device to be connected to is to be canceled (step 850) at predetermined time intervals. When the selection is canceled, the process is terminated. When the selection is not canceled, the step 820 is performed.

The architecture of the home network shown in FIG. 3 shows only a small part of the home network. The DTV can be replaced by any digital device including the display device, into which a web browser is loaded, such as a PC. The architecture of the home network can vary.

The home device includes every digital device used at home such as a TV, a VCR, an audio device, a digital satellite service device, a sprinkler system, a lighting system, or conventional home appliances such as a refrigerator, an oven, or a range.

The apparatus set forth in the present application may be specifically constructed for the required purposes or it may comprise a general purpose computer or other network device selectively activated or reconfigured by a computer program stored in the computer. The processes presented herein are not inherently related to any particular computer or other apparatus. In particular, various general purpose machines may be used with programs in accordance with the teachings herein, or it may prove more convenient to construct a more specialized apparatus to perform the required method steps. While the present invention can certainly be realized on a so-called personal computer, including those employing the INTEL PENTIUM® architecture, any data processing device capable of performing the required operation may be used.

Thus, the above embodiment of the present invention can be written as a program which can be executed by a computer and can be realized in a generally used digital computer for operating the program from media used in a computer. The media includes storage media such as magnetic storing media, for example, ROM, a floppy disk, and a hard disk, optical reading media, for example, a CD-ROM and a DVD, and a carrier wave transmitted by the Internet.

The recording media stores a program code for executing the steps of preparing the home page of the client device so as to display server device icons for selecting server devices to be connected to, selecting one of the server devices to be connected to from the home page, reading a register OPCR for recording an operation state and channel information of the selected server device from the selected server device, and completing connection to the selected server device by recording the channel information of the selected server device in a register IPCR when the read operation state is active and checking the operation state of the server device by reading the register OPCR at predetermined time intervals when the read operation state is inactive in a method for contacting the server device in the browser-based home network comprised of the server devices including the function of a web server and a client device into which a web browser is loaded for controlling the server devices through the web browser.

The program further includes a program code for executing the steps of preparing the home page of the client device including generating an identification information storing unit of the server devices to be connected to, checking whether the selected server device is registered in the identification information storing unit, and reading the register OPCR only when the selected server device is registered in the identification information storing unit and not connecting to the server device when the server device is not registered in the identification information storing unit, in the computer.

Functional programs, codes, and code segments for realizing the present invention can be easily determined.

According to the present invention, a user can easily and rapidly connect to server devices through a browser in a browser-based home network.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of connecting to server devices in a browser-based home network comprising the server devices each including a function of a web server and a client device into which a web browser is installed for controlling the server devices through the web browsers, the method comprising:

preparing a home page of the client device so as to display server device icons for selecting the server devices to be connected to;

generating an identification information storing unit in which the server devices to be connected to are registered;

selecting one of the server devices to be connected to in the home page;

checking whether the selected server device is registered in the identification information storing unit;

reading a register OPCR in which an operation state and channel information of the selected server device are recorded from the selected server device only when the selected server device is registered in the identification information storing unit and not connecting to the server device when the selected server device is not registered in the identification information storing unit;

completing connecting to the selected server device by recording the channel information of the selected server device in a register IPCR when the read operation state is active; and checking the operation state of the selected server device by reading the register OPCR at predetermined time intervals when the read operation state is inactive.

2. The method of claim 1, wherein each server device has unique identification information and the identification information storing unit has a look-up table in which the server devices to be connected are registered, and the checking of whether the selected server device is registered comprises comparing the identification information of the selected server device with the look-up table.

3. The method of claim 1, wherein the selecting of one of the server devices comprises using a mouse to click on one of the display server device icons or touching the one display server device icon by the user.

4. The method of claim 1, wherein the register OPCR includes information showing whether the selected server device outputs data to a data bus and a channel number of the selected server device when the server device outputs the data to the data bus.

5. The method of claim 1, further comprising displaying various control parameters of the selected server device which are adjustable in response to selecting the selected server device.

6. The method of claim 1, further comprising displaying various control parameters of the selected server device which are adjustable in response to selecting the selected server device, and a source control display to enable changing of the selected server device to another one of the server devices.

7. The method of claim 1, wherein:

the preparing of the home page comprises displaying a client device icon along with the server device icons, and the method further comprises displaying various control parameters of one of the server devices which are adjustable and a source icon indicating the one of the server devices the selection of which is changeable.

8. The method of claim 7, wherein:

the control parameters include a volume control and a channel selection; and if data of the channel selected does not exist, the method further comprises:

redisplaying and then selecting the client server icon, and displaying a power on/off control display of the one server device in response to the selecting of the client server icon.

9. A computer program for a home network comprising a plurality of server devices each including a web server function and a client device including a web browser for controlling the server devices, the computer program comprising:

means for preparing a home page of the client device which includes display server device icons enabling selection of the server devices to be connected to;

means for generating an identification storing unit in which the server devices to be connected to are registered;

means for reading a register OPCR of one of the server devices selected by a user from the home page of the client device in which an operation state and channel information of the selected server device are recorded from the selected server device, wherein the means for reading the register OPCR reads the register OCPR only when the selected server device is registered in the information storing unit;

means for completing a connection between the client device and the selected server device by recording the channel information of the selected server device in a register IPCR of the client device in response to the read operation state being an active state; and means for checking the operation state of the selected server device by reading the register OPCR at predetermined time intervals when the read operation is inactive.

10. A computer readable medium encoded with software for causing a computer program to perform the actions of:

preparing a home page of a client device having a web browser and which home page includes display server device icons enabling selection of a plurality of server devices to be connected to the client device and controlled through a web based home network by using the web browser;

generating an identification storing unit in which the server devices to be connected are registered;

selecting one of the server device icons in the home page;

reading a register OPCR of selected server device in which an operation state and channel information of the selected server device are recorded;

completing a connection between the client device and the selected server device by recording the channel information of the selected server device in a register IPCR of the client device in response to the read operation state being an active state, wherein the connection is completed only when the selected server device is registered in the identification information storing unit; and checking the operation state of the selected server device by reading the register OCPR at predetermined time intervals when the read operation state is inactive.

11. The computer readable medium as claimed in claim 10, wherein the register OPCR includes information showing whether the selected server device outputs data to a data bus and a channel number of the selected server device when the server device outputs the data to the data bus.

12. The computer readable medium as claimed in claim 10, which causes displaying various control parameters of the selected server device which are adjustable in response to selecting the selected server device.

13. The computer readable medium as claimed 10, which causes displaying various control parameters of the selected server device which are adjustable in response to selecting the selected server device, and a source control display to enable changing of the selected server device to another one of the server devices.

14. The computer readable medium as claimed 10, which causes displaying a client device icon along with the server device icons, and displaying various control parameters of one of the server devices which are adjustable and a source icon indicating the one server devices the selection of which is changeable.

15. The computer readable medium as claimed in claim 14, wherein the control parameters include a volume control and a channel selection, wherein if data of the channel selected does not exist, the computer readable medium causes:

redisplaying and then selecting of the client server icon; and displaying a power on/off control display of the one server device in response to the selecting of the client server icon.

16. A network comprising:

a plurality of server devices each including a web server function;

a client device including a web browser which controls the server devices;

means for preparing a home page of the client device which includes display server device icons enabling selection of the server devices to be connected to;

means for generating an identification storing unit in which the server devices to be connected to are registered;

means for reading a register OPCR of one of the server devices selected by a user from the home page of the client device in which an operation state and channel information of the selected server device are recorded from the selected server device, wherein the means for reading the register OPCR reads the register OPCR only when the selected server device is registered in the information storing unit;

means for completing a connection between the client device and the selected server device by recording the channel information of the selected server device in a register IPCR of the client device in response to the read operation state being an active state; and means for checking the operation state of the selected server device by reading the register OPCR at predetermined time intervals when the read operation state is inactive.

* * * * *